(No Model.)
W. R. WILCOX.
WAGON BRAKE.
No. 462,754. Patented Nov. 10, 1891.
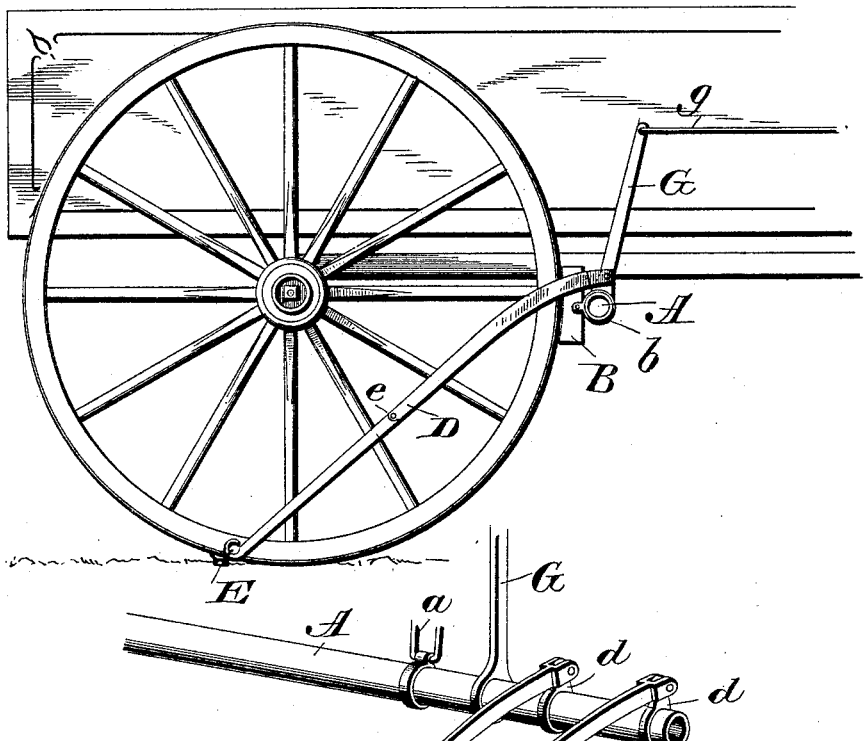
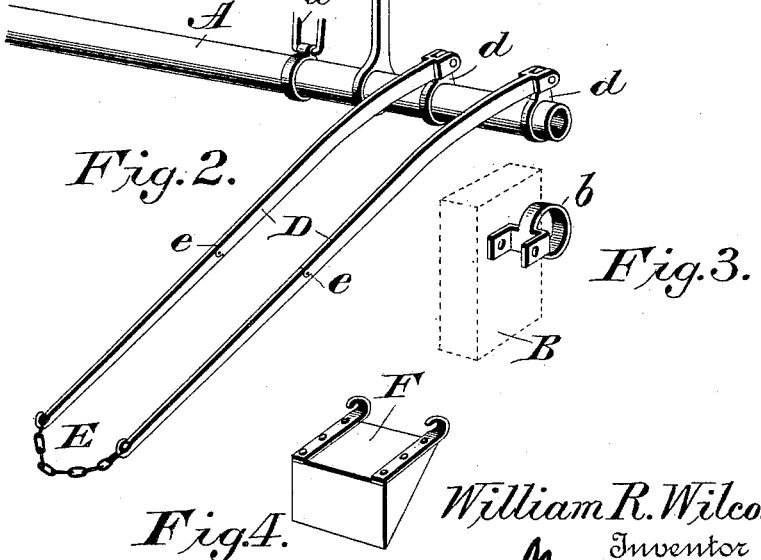
Witnesses
L. S. Elliott.
T. W. Johnson
William R. Wilcox
Inventor
by [signature]
Attorney

UNITED STATES PATENT OFFICE.

WILLIAM R. WILCOX, OF RIDGWAY, COLORADO.

WAGON-BRAKE.

SPECIFICATION forming part of Letters Patent No. 462,754, dated November 10, 1891.

Application filed April 23, 1891. Serial No. 390,140. (No model.)

*To all whom it may concern:*

Be it known that I, WILLIAM R. WILCOX, a citizen of the United States of America, residing at Ridgway, in the county of Ouray and State of Colorado, have invented certain new and useful Improvements in Wagon-Brakes; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to improvements in wagon-brakes.

The object of the invention is to provide a simple, cheap, and effective wagon-brake which is so constructed that it may be used in connection with the ordinary brake-shoes, and thereby more effectively lock the wheel when desired, irrespective of the condition of the road; and the invention consists in the construction and combination of the parts, as will be hereinafter fully set forth, and particularly pointed out in the claims.

In the accompanying drawings, forming part of this specification, Figure 1 is a side view showing my improved brake applied to a vehicle. Fig. 2 is a detail perspective view. Fig. 3 is a detail view of the brake-block, and Fig. 4 is a detail perspective view of a modification.

A refers to the brake-bar, which is made up of a tube of metal or bar of wood, and is attached to or hung from the reaches or frame of the wagon by links $a$, said links connecting with loose collars on the brake-bar, which connection permits said brake-bar to have a swinging and a revolving movement, for the purpose to be hereinafter set forth. The brake-bar extends beyond the wagon-body and carries near its ends the ordinary brake-blocks B B, which are connected thereto by clips $b\ b$ and contact with the peripheries of the wheels in the usual manner.

To the brake-bar on each side of the brake-block are rigidly secured ears $d\ d$, to which are pivoted arms D D, which extend on each side of the wheel to a point rear thereof, where they are connected by a drag-chain E, which is moved under the wheel to form an additional brake. Instead of the chain E, I may attach the block F to the ends of the arms D D, which latter will serve better when snow is on the ground, as the chain is liable to collect the snow and form a ball.

The brake-bar is operated by means of the lever G, which is rigidly connected thereto and rocked by the rod $g$, which extends forward to the usual operating-lever.

The arms D D, which carry the drag-chain, are provided at a suitable point with a rule-joint $e$, which permits the arms to turn up should the wagon be backed.

When it is desired to apply the brakes, the lever G is operated to throw the brake-shoes B against the wheel, after which a further operation of the lever will turn the brake-bar to draw upon the arms D D and move the drag-chain beneath the wheel to more effectively chock the same.

The device may be used independent of the brake-blocks when it is desired to only use a drag-brake, and when a drag-brake is not needed the bars or arms D D can be folded and hung upon the wagon body or gear, and in order that this may be more readily done one of the arms has a hook formed thereon, so that the chain can be detached.

Chains may be employed instead of the arms D D, the ends of which are provided with hooks which engage the ears $d\ d$ or short links projecting therefrom.

Having thus described my invention, what I claim as new, and desire to secure by Letters Patent, is—

1. In a brake for vehicles, a brake-bar carrying rearwardly-projecting arms, to which a drag-chain is secured, said drag-chain being adapted to be moved beneath the wheel upon a forward movement of the arms, substantially as set forth.

2. In a brake for vehicles, a brake-bar carrying rearwardly-projecting arms, jointed as shown and having a drag-chain at their lower ends which is adapted to move beneath the wheel upon a forward movement of the arms, substantially as set forth.

3. In a brake for vehicles, a brake-bar suspended from the vehicle-frame by a link to have a swinging and a revolving movement, rearwardly-extending arms pivoted to said brake-bar, jointed as shown and carrying a drag-chain or block at their lower ends, together with a lever for operating said brake-bar, substantially as set forth.

4. In a brake for vehicles, a brake-bar carrying the ordinary brake-shoes B, rearwardly-extending arms D D, projecting on each side of the wheel to the rear thereof and carrying a drag-chain at their lower ends, each of said arms having a rule-joint at a suitable point, together with a lever G for rocking and revolving the brake-bar, for the purpose set forth.

5. In a brake for vehicles, a tubular brake-bar supported from the frame of the vehicle by links $a$, which connect with loose collars on the brake-bar to permit said brake-bar to have a swinging and a revolving movement, ears $d\ d$, secured to the brake-bar and to which are pivotally attached rearwardly-extending arms D D, jointed as shown and carrying a drag-chain at their lower ends, together with a lever G, rigidly attached to the brake-bar and adapted when drawn upon to move the brakes in contact with the wheel, substantially as set forth.

In testimony whereof I affix my signature in presence of two witnesses.

WILLIAM R. WILCOX.

Witnesses:
ERNEST C. BACON,
JOHN M. SANFORD.